PULSE TRANSMISSION SYSTEM

Filed July 16, 1959 3 Sheets-Sheet 1

INVENTOR.
JOHN O. BOWERS, JR.
BY
Brumbaugh, Free, Graves & Donohue
his ATTORNEYS INVENTOR.
JOHN O. BOWERS, JR.
BY
Brumbaugh, Free, Graves + Donohue
his ATTORNEYS Jan. 8, 1963 J. O. BOWERS, JR 3,072,744

PULSE TRANSMISSION SYSTEM

Filed July 16, 1959 3 Sheets-Sheet 3

INVENTOR.
JOHN O. BOWERS, JR.

BY

Brumbaugh, Free, Graves & Donohue
his ATTORNEYS 3,072,744
PULSE TRANSMISSION SYSTEM John O. Bowers, Jr., Washington, D.C., assignor to Vitro Corporation of America, New York, N.Y.

Filed July 16, 1959, Ser. No. 827,478
11 Claims. (Cl. 178—71)

This invention relates to the transmission of pulse information in a selected direction along an extended bi-directional transmission line.

The transmission of pulse information in the binary code, for example, along an extended line requires the use of repeaters at spaced intervals. It is desirable to transmit such pulse information in either direction along the line. Transmission lines used for this purpose have been provided with diodes to achieve bi-directionality. However, in such lines repeaters had to be closely spaced to overcome the problems of low frequency noise or drift which frequently reverse biased the diodes and obscured the information pulses at the receiving end of the line.

The use of transmission lines for binary pulse information has also resulted in troublesome line charging. In the straight binary code each 1 is enumerated by a positive pulse. Therefore, a long series of such positive pulses charges the line sufficiently to obscure the pulses towards the end of the series at the receiving end of the line.

Problems of repeater reliability have also been encountered in pulse transmission lines. Preferably, failure of a repeater in the line should not interfere with the ability of the line to transmit the pulse information.

The present invention provides for efficient and reliable transmission of pulse information along an extended line. To this end, a plurality of bistable repeaters responding alternately to pulses of opposite polarity are connected in parallel with the line. Pulses will travel in either direction along the line and failure of one or more repeaters will not unduly affect pulse transmission.

The inventive system may be used, inter alia, to transmit binary pulse information in a non-return to zero (NR0) form or in a modified straight binary (MSB) form. Assuming all of the bistable repeaters to be in the same state, referred to as the minus state, and also assuming the introduction of a positive pulse at one end of the line, a first repeater will be switched to its plus state causing application of a positive pulse to the line. Subsequently, further along the line, the positive pulse will switch a second repeater from its minus to plus state with a resulting positive pulse output to the line. This latter positive pulse will travel in the selected direction of transmission but will also return towards the first repeater. However, in its plus state the first repeater will not respond to positive pulses and, therefore, the positive pulse is attenuated rapidly by the transmission line.

It will be evident that the positive pulse will be transmitted along the line by the successive repeaters until it arrives at the receiving or terminal end of the line. The next bit of information must be in the form of a negative pulse which, when it reaches the first repeater, will cause it to return to its minus state and at the same time generate and supply a negative pulse to the transmission line. In the same manner as described in connection with the positive pulse, the negative pulse will be transmitted along the line to its terminal end.

These and further advantages of the invention will be more readily understood when the following description is read in connection with the following drawings, in which.

Figure 1:
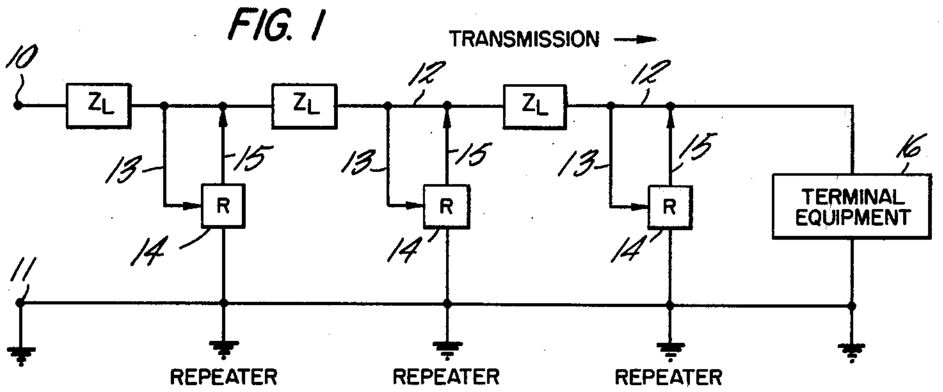
FIGURE 1 is a circuit diagram in block form of a transmission system for pulse information in accordance with the principles of the present invention.

Referring to an illustrative embodiment of the invention in greater detail with particular reference to FIGURE 1, pulse information applied to input terminals 10 and 11 travels along an extended transmission line 12, shown as a single wire line with ground return, and is attenuated by line impedance represented by the blocks designated $Z_L$. Of course, any other desired type of transmission line may be used.

In the transmission of pulses in the binary code, pulse information in the non-return to zero (NR0) form, or in the form in which successive pulses are alternately positive and negative, referred to hereinafter as a modfied straight binary (MSB) form, is preferably used. Conversion from straight binary notation to the NR0 and MSB notation and vice versa is well known in the art and forms no part of the present invention.

The pulse information transmitted along the line 12 is attenuated by line impedance represented by the blocks designated $Z_L$, and must be amplified for further transmission. An input circuit 13 of a repeater 14, connected in parallel with the line 12, amplifies the pulse information and supplies it through an output circuit 15 to the transmission line 12. Preferably the impedance of the repeater 14 viewed by the line 12 is equal to the characteristic impedance of the line to avoid discontinuities in the circuit.

A plurality of the repeaters 14 are connected in parallel with the line 12 at spaced intervals to provide efficient transmission of the binary pulse information to terminal equipment 16. Preferably the repeater spacing is such that failure of a single repeater 14 between two operative repeaters will not interfere with pulse transmission along the line 12.

Examining the manner of pulse transmission, each of the repeaters 14 is alternately responsive to opposite polarity pulses on the line 12 to supply output pulses to the line 12. To this end, the repeater 14 includes a bistable circuit switched to one or the other state depending upon the polarity of the pulse supplied thereto. Thus, if the repeater 14 is in what may be termed its minus state, application of a positive pulse thereto will switch it to its plus state, and if in its plus state, application of a negative pulse thereto will switch the repeater 14 to its minus state. Moreover, when the repeater 14 switches from its minus to plus state it generates a large positive pulse at its output, and when it switches from its plus to its minus state it generates a large negative pulse.

Of importance is the fact that after the repeater 14 has been switched to its plus state by a positive pulse, it will not respond to subsequent positive pulses and, conversely, after the repeater has been switched to its minus state by negative pulses, it will ignore subsequent negative pulses.

In operation, assuming that the repeaters 14 are in their minus states, and further assuming the application of a positive pulse to the line 12 at the terminals 10 and 11, such pulse will travel from left to right as indicated along the line to the input circuit 13 of the first repeater 14. Since the repeater 14 is in its minus state, the positive pulse will switch it to its plus state and a large positive voltage pulse will be supplied via the output circuit 15 to the line 12. Such positive pulse will be attenuated as it is transmitted along the line 12 until it reaches the next repeater 14. Since that repeater is also in its minus state, the positive pulse in its input circuit 13 will switch it to its plus state and a large positive pulse will be supplied via the output circuit 15 to the transmission line 12.

The positive pulse supplied by the second repeater will travel in both directions along the line 12. The pulse traveling to the left in FIGURE 1 will again encounter the first repeater 14 but since it has been switched to its plus state, it will ignore the positive pulse and subsequently such pulse will be attenuated by the line. Of course, the repeater spacing and the information rate must be such that the leftward traveling positive pulse will not have sufficient amplitude to cause interference at its point of encounter with a subsequent primary negative information pulse.

The positive pulse traveling to the right in FIGURE 1 will eventually reach the third repeater 14, which is in its minus state, and in the same manner as described in connection with the first and second repeaters, another positive pulse will be furnished to the line 12. Finally, the positive pulse will reach the terminal equipment 16.

The next information bit supplied to the line will be in the form of a negative pulse which, upon reaching the first, second and third repeaters 14, will switch them from the plus to the minus state with the resultant generation of a negative pulse via output circuits 15 to the line 12. As described in connection with the positive pulse, the negative pulse will travel along the line 12 in one direction to the terminal equipment 16 because the switched repeaters 14 will ignore negative pulses traveling to the left along the line 12. In other words, each pulse conveyed down the line 12 leaves the parallel connected repeaters 14 in the correct state to receive and amplify the next information pulse.

It will be evident that pulses applied to the line at the terminal equipment 16 will travel from right to left in the same manner as discussed for pulses traveling from left to right. In other words, the line is inherently bi-directional (i.e., is a single-wire system capable of two-way communication without reversing polarity), and yet the line transmits pulses in a selected direction without modification thereof.

Figure 2:
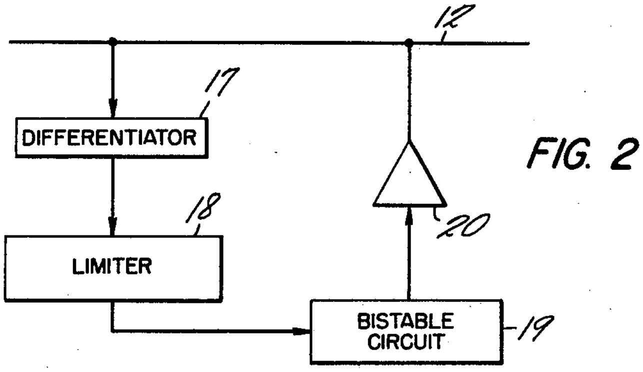
FIGURE 2 is a schematic diagram in block form of a repeater that may be used in the system of FIGURE 1.

Referring next to an illustrative repeater 14 with reference to FIGURE 2, a differentiator 17 and a limiter 18 are connected in series between the line 12 and a bistable circuit 19. An amplifier 20 couples the output of the bistable 19 to the transmission line 12. Since regenerative feedback exists between the input and the output of the bistable 19, it is desirable to include the limiter 18 to prevent the application of excessive potentials to the input of the bistable circuit.

The differentiator 17 and limiter 18 may take any conventional form. For example, in FIGURE 3 the differentiator 17 includes an RC network formed of a capacitor 21 and a resistor 22 the output of which is coupled to a pair of reversely connected series diodes 23 and 24 forming the limiter 18. The common junction of the diodes 23 and 24 is biased by a positive potential source 25 of, for example, 1½ volts, through a resistor 26 while the other side of the diode 24 is biased through a resistor 27 by a negative potential source 28 of, for example, 1.5 volts.

Figure 4:
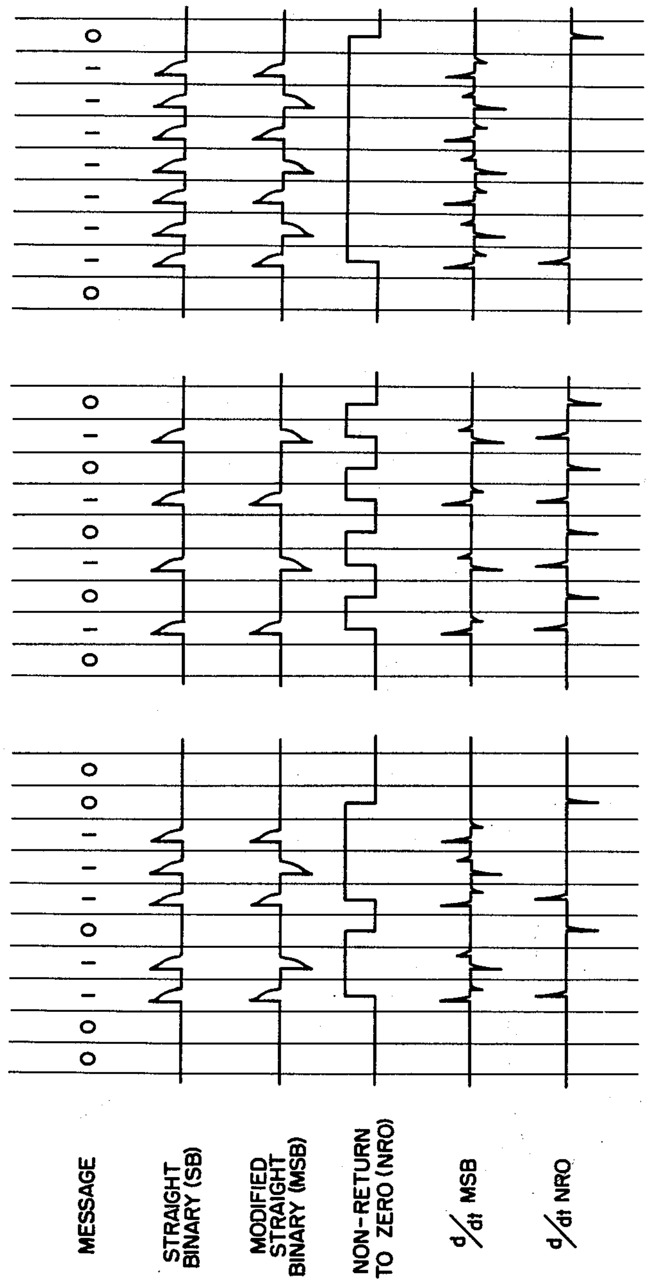
FIGURE 4 illustrates waveforms of binary pulse information in various forms.

Before completing a discussion of the repeater circuits, it will be helpful to refer to the correlation in FIGURE 4 of exemplary forms of pulse information that may be transmitted along the line 12 in accordance with the invention. If the NR0 binary form is used, a positive step is initiated by a straight binary (SB) pulse and becomes negative in the absence of a SB pulse which is indicative of 0. A positive step applied to the differentiator 17 results in the generation of a positive pulse at its leading edge and a negative pulse at its trailing edge, which is also the leading edge of a negative step or pulse. The differentiated pulses are limited by the biased diodes 23 and 24 to a preselected amplitude to prevent overloading of the bistable circuit 19. In the MSB form of pulse information, positive and negative pulses are generated by the differentiator 17 for each pulse. However, the fast rise time of each leading edge provides a pulse of substantially greater amplitude than the pulse resulting from differentiation of each trailing edge. Accordingly, by having the bistable 19 respond only to pulses in excess of the amplitude of the pulses generated by the trailing edge, the MSB system may be used.

The bistable circuit 19 may be of conventional design. For example, the transistor bistable trigger circuits disclosed in the text "Principles of Transistor Circuits," by Shea, published in 1953 by John Wiley & Sons, Inc., at pages 426 to 431, may be used. Further, the bistable multivibrators disclosed in "Pulse and Digital Circuits," by Millman and Taub, published in 1956 by McGraw-Hill Book Company, Inc., in Chapter 5 (tube type) and Chapter 18 (transistor type) may also be used. This text discusses switching of bistable circuits by pulses of opposite polarity, also referred to as unsymmetrical triggering.

In operation of the FIGURE 2 circuit, pulses traveling along the transmission line 12 are differentiated and limited by the circuits 17 and 18 and applied to the bistable circuit 19. If the circuit is in its minus state and receives a positive pulse, it switches to its plus state and provides a positive output amplified by the circuit 20 and applied to the line 12. The amplifier 20 is coupled to the bistable 19 to transmit pulses of the same polarity to the line 12 that were received at the repeater input. Therefore, it may be an inverting or non-inverting circuit depending upon its connection to the bistable 19. If the NR0 form of pulse information is being used, the amplifier 20 may provide D.-C. amplification if low frequency drift is not a problem. If the MSB system is used, an A.-C. amplifier may be used. However, it should be noted that either A.-C. or D.-C. amplification may be provided since conversion of the resulting transmitted pulses at the receiving end of the line is readily accomplished.

Figure 3:
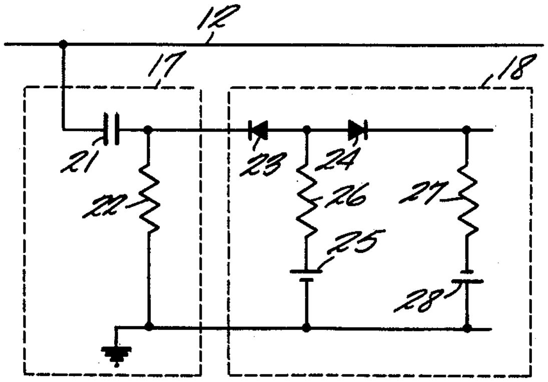
FIGURE 3 is a schematic diagram of a differentiator and limiter that may be used in the repeater illustrated in FIGURE 2.
Figure 5:
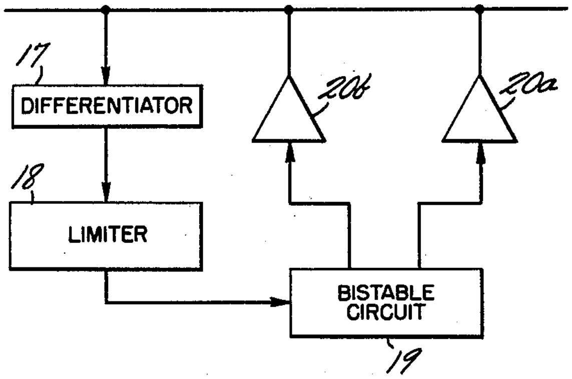
FIGURES 5 and 6 are schematic circuit diagrams in block form of further repeaters that may be used in the system of FIGURE 1.

Another illustrative repeater 14 that may be used is illustrated in FIGURE 5. The input circuit includes the differentiator 17 and limiter 18 such, for example, as shown in FIGURE 3. A transistor or a tube type multivibrator is used for the bistable circuit 19 and a pair of amplifiers **20*a* and 20*b* working in parallel are coupled to its opposite polarity outputs. The amplifier 20*a* is non-inverting while the amplifier 20*b* inverts the signal. Accordingly, either one of the amplifiers 20*a* or 20*b* may fail and the repeater 14** will continue to operate.

The repeaters 14 require a certain amount of power for operation even when transistorized. To provide less current drain, the repeater 14 illustrated in FIGURE 6 may be used. The input circuit is the same as shown in FIGURES 2 and 5 and includes the differentiator 17 and limiter 18. However, in this repeater the bistable circuit 19 operates at a substantially lower level than the bistable of FIGURES 2 and 5 to consume substantially less power. The output of the bistable 19 is then supplied through a further differentiator 29 to a pair of parallel connected amplifiers 30 and 31 effective to supply positive and negative pulses, respectively, to the line 12. Such amplifiers may take the form of transistor amplifiers biased to cut-off in order to consume a minimum amount of power. Accordingly, positive pulses will be transmitted through the amplifier 30 and a coupling capacitor 32 to the transmission line 12 while negative pulses will be transmitted through the amplifier 31 and a coupling capacitor 33 to the line 12.

Figure 6:
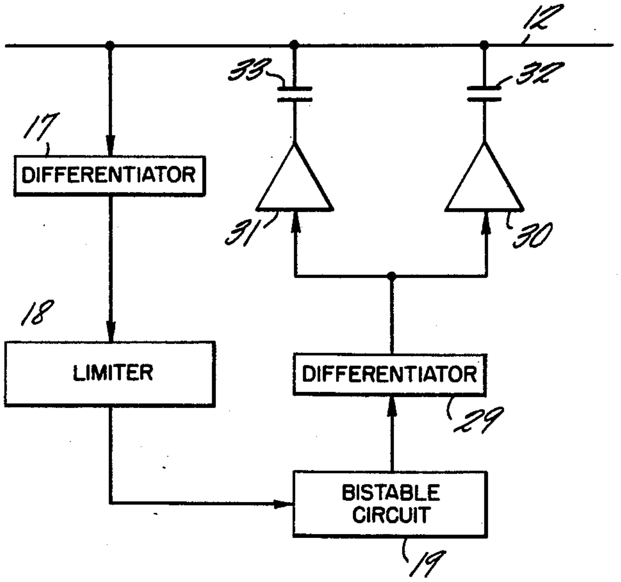

It is apparent that the repeater of FIGURE 6 cannot be used to step the line up and down in potential as required by the NR0 form of binary information. However, positive and negative pulses applied to the line 12 as a result of differentiated NR0 pulses may be readily converted to NR0 information at the terminal end of the line.

The present invention provides a bi-directional line transmitting pulses in a selected direction without the use of polarized elements such as diodes. It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. A system for transmitting successive electrical pulses of opposite polarity comprising an extended transmission line attenuating the pulses, a plurality of spaced repeaters connected in parallel with said line, and circuit means in each of the repeaters alternately responsive to opposite polarity pulses on the line to generate and supply a higher amplitude pulse of the same polarity as the actuating pulse to the line, said circuit means being unresponsive to the second of two successive pulses of the same polarity, whereby pulses will be transmitted in only a selected direction along the line.

2. In a system for transmitting successive electrical pulses of opposite polarity along a transmission line, a repeater having input and output circuits connected in parallel with the line, and circuit means in said repeater alternately responsive to opposite polarity pulses coupled to the input circuit from the line to generate and supply a higher amplitude pulse of the same polarity as the actuating input pulse to the line through the output circuit, said circuit means being unresponsive to the second of two successive pulses of the same polarity.

3. A system for transmitting successive electrical pulses of opposite polarity comprising an extended transmission line, a plurality of repeaters having input and output circuits, means connecting said repeaters at spaced intervals in parallel with the transmission line, each of said repeaters being alternately responsive to opposite polarity pulses coupled to the input circuit from the line to generate and supply a higher amplitude pulse of the same polarity as the actuating input pulse to the line through the output circuit, and each of said repeaters being unresponsive to the second of two successive pulses of the same polarity, whereby pulses will be transmitted in only a selected direction along the line.

4. A system for transmitting successive electrical pulses of opposite polarity comprising an extended transmission line, a plurality of spaced repeaters connected in parallel with the line, each of said repeaters including a bistable circuit switched from a first state to a second state by pulses of one polarity and from the second state to the first state by pulses of the opposite polarity, a differentiator for coupling pulses from the transmission line to the repeater to operate the bistable circuit upon receipt of proper polarity pulses, and circuit means responsive to the output of the bistable circuit when it switches states to supply to the line a pulse of the same polarity and greater amplitude than the transmission line pulse coupled from the line to the repeater, whereby pulses will be transmitted only in a selected direction along the line.

5. Apparatus as defined in claim 4 wherein a limiter is connected in the output of the differentiator to prevent the receipt of pulses of excessive amplitude by the bistable circuit.

6. Apparatus as defined in claim 4, wherein circuit means responsive to the bistable circuit output include a differentiator connected in series with a pair of normally cut-off parallel connected amplifiers, one of the amplifiers coupling pulses of one polarity to the line and the other amplifier coupling pulses of the opposite polarity to the line.

7. Apparatus as defined in claim 4, wherein the bistable circuit output includes two outputs of opposite polarity, and the circuit means responsive to the bistable circuit output includes a noninverting amplifier coupling one of the two outputs to the transmission line and an inverting amplifier coupling the other output to the transmission line.

8. A system for transmitting successive electrical pulses of opposite polarity comprising an extended transmission line, a plurality of spaced repeaters connected in parallel with the line, each of said repeaters including a bistable circuit switched from a first state to a second state by pulses of one polarity and from the second state to the first state by pulses of the opposite polarity, a differentiating circuit in the input of the bistable circuit responsive to pulses from the transmission line to generate sharply defined pulses for actuating the bistable circuit, and circuit means responsive to the output of the bistable circuit when it switches states to supply to the line a pulse of the same polarity and greater amplitude than the transmission line pulse applied to the differentiator, whereby pulses will be transmitted only in a selected direction along the line.

9. Apparatus as defined in claim 8, wherein a limiter is connected in the output of the differentiator to prevent the receipt of pulses of excessive amplitude by the bistable circuit.

10. Apparatus as defined in claim 8, wherein circuit means responsive to the bistable circuit output includes a differentiator connected in series with a pair of normally cut-off parallel connected amplifiers, one of the amplifiers coupling pulses of one polarity to the line and the other amplifier coupling pulses of the opposite polarity to the line.

11. Apparatus as defined in claim 8, wherein the bistable circuit output includes two outputs of opposite polarity, and the circuit means responsive to the bistable circuit output includes a noninverting amplifier coupling one of the two outputs to the transmission line and an inverting amplifier coupling the other output to the transmission line.

References Cited in the file of this patent

UNITED STATES PATENTS

| | | |
|---|---|---|
| 2,585,571 | Mohr | Feb. 12, 1952 |
| 2,703,368 | Wrathall | Mar. 1, 1955 |
| 2,802,052 | Brewster | Aug. 6, 1957 |